US011589081B2

(12) United States Patent
Hasek, IV et al.

(10) Patent No.: US 11,589,081 B2
(45) Date of Patent: *Feb. 21, 2023

(54) TIERED DIGITAL CONTENT RECORDING

(71) Applicant: T-Mobile USA, Inc., Bellevue, WA (US)

(72) Inventors: Charles A. Hasek, IV, Denver, CO (US); Brian Stark, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,234

(22) Filed: Jan. 14, 2022

(65) Prior Publication Data
US 2022/0141499 A1 May 5, 2022

Related U.S. Application Data

(63) Continuation of application No. 16/131,751, filed on Sep. 14, 2018, now Pat. No. 11,265,585.

(60) Provisional application No. 62/558,888, filed on Sep. 15, 2017.

(51) Int. Cl.
| H04N 21/231 | (2011.01) |
| H04N 21/218 | (2011.01) |
| H04N 21/442 | (2011.01) |
| H04L 67/1097 | (2022.01) |
| H04L 67/1014 | (2022.01) |
| H04N 21/24 | (2011.01) |
| H04L 67/56 | (2022.01) |
| H04N 21/25 | (2011.01) |

(52) U.S. Cl.
CPC ..... *H04N 21/2181* (2013.01); *H04L 67/1014* (2013.01); *H04L 67/1097* (2013.01); *H04L 67/56* (2022.05); *H04N 21/23103* (2013.01); *H04N 21/23113* (2013.01); *H04N 21/23116* (2013.01); *H04N 21/24* (2013.01); *H04N 21/44213* (2013.01); *H04N 21/251* (2013.01)

(58) Field of Classification Search
CPC ......... H04N 21/2181; H04N 21/23103; H04N 21/23113; H04N 21/23116; H04N 21/24; H04N 21/44213; H04N 21/251; H04L 67/56; H04L 67/1014; H04L 67/1097
See application file for complete search history.

(56) References Cited

U.S. PATENT DOCUMENTS 7,254,622 B2   8/2007  Nomura et al.
7,610,280 B2  10/2009  O'Toole et al.
(Continued)

*Primary Examiner* — Jefferey F Harold
*Assistant Examiner* — Alexander Boyd
(74) *Attorney, Agent, or Firm* — Brownstein Hyatt Farber Schreck, LLP

(57) ABSTRACT

A digital content recording network controller device determines a first content of a set of content to be more likely to be requested by a user of a content access device than a second content of the set of content based on monitored behavior of the user. The device stores the first content in a first storage device of a tiered group of storage devices and stores the second content in a second storage device of the tiered group of storage devices wherein the content access device is located closer to the first storage device than the second storage device. This balances storage load with accessibility, resulting in a faster responding system that does not require as much storage.

19 Claims, 11 Drawing Sheets

(56) References Cited

U.S. PATENT DOCUMENTS

| | | | |
|---|---|---|---|
| 2004/0085959 A1* | 5/2004 | Ohkawa | H04L 47/15 370/252 |
| 2006/0161635 A1* | 7/2006 | Lamkin | G06F 16/16 709/217 |
| 2009/0083279 A1 | 3/2009 | Hasek et al. | |
| 2009/0168795 A1 | 7/2009 | Segel et al. | |
| 2011/0191447 A1 | 8/2011 | Dazzi et al. | |
| 2011/0293251 A1 | 12/2011 | Roberts et al. | |
| 2014/0136782 A1 | 5/2014 | Thomas et al. | |
| 2015/0296234 A1 | 10/2015 | Korst et al. | |
| 2015/0324555 A1* | 11/2015 | Burba | H04L 67/1068 726/27 |
| 2016/0055186 A1 | 2/2016 | Courtney et al. | |
| 2016/0231928 A1 | 8/2016 | Lewis et al. | |
| 2017/0060683 A1 | 3/2017 | Luby et al. | |
| 2017/0264968 A1 | 9/2017 | Mao et al. | |
| 2017/0318092 A1 | 11/2017 | Maredia et al. | |
| 2018/0276263 A1* | 9/2018 | Voigt | G06F 9/4881 |

* cited by examiner

TIERED DIGITAL CONTENT RECORDING

CROSS-REFERENCE TO RELATED APPLICATION(S)

This application is a continuation patent application of U.S. patent application Ser. No. 16/131,751, filed Sep. 14, 2018 and titled "Tiered Digital Content Recording," which is a nonprovisional patent application of and claims the benefit of U.S. Provisional Patent Application No. 62/558,888, filed Sep. 15, 2017 and titled "Tiered Digital Content Recording," the disclosures of which are hereby incorporated herein by reference in their entireties.

FIELD

The described embodiments relate generally to digital video or other content recorders. More particularly, the present embodiments relate to a tiered digital content recording network that manages storage based on monitored user behavior.

BACKGROUND

Users may use content access devices such as set top boxes, televisions, computing devices, and so on to access a variety of different instances of content from various content provider networks. This content may include video content, audio content, image content, data content, and so on. In some situations, the content may be part of a linear broadcast. In other situations, the content may be provided upon request and/or in various non-linear ways.

The content access device may be configured to perform various digital video (or other content) recording (DVR) functions. In short, the content access device may store received content so that the content is available to the user at a later time, particularly linear broadcast content that a user may miss if the user is not watching at a scheduled broadcast time.

The content access device may have a limited storage capacity. As such, the content access device may be able to store a limited amount of content for the user. If storage is full, stored content may need to be deleted before additional content can be stored.

SUMMARY

The present disclosure relates to tiered digital content recording. Digital content is recorded for a user of a content access device in a tiered group of storage devices. The storage is managed based on monitored behavior of the user so that recordings more likely to be accessed are more quickly accessible whereas recordings less likely to be accessed are less quickly accessible. This balances storage load with accessibility, resulting in a faster responding system that does not require as much storage.

In various implementations, a digital content recording network includes a tiered group of storage devices and a controller, communicably coupled to the tiered group of storage devices, that manages storage of a set of content in the tiered group of storage devices based on monitored behavior of a user of a content access device. The controller determines a first content of the set of content to be a higher priority for the user than a second content of the set of content based on the monitored behavior and directs storage of the first content in a first storage device of the tiered group of storage devices and the second content in a second storage device of the tiered group of storage devices that is less quickly accessible to the content access device than the first storage device.

In some examples, the controller determines to move at least some of the stored content within the tiered group of storage devices based at least on the monitored behavior. In various cases of such examples, the controller moves the determined content. In numerous cases of such examples, the controller moves a first portion of an instance of the stored content without moving a second portion. In some cases of such examples, the controller determines a connection issue prevents movement of the determined content, waits until the connection issue is resolved, and moves the determined content.

In various cases of such examples, the controller determines to move at least some of the stored content based on a change in the monitored behavior of the user or a change in circumstances. In numerous cases of such examples, the controller determines to move at least some of the stored content based on a change in storage capacity.

In some implementations, a digital content recording network controller device includes a non-transitory storage medium that stores instructions and a processing unit. The processing unit executes the instructions stored in the non-transitory storage medium to determine a first content of a set of content to be more likely to be requested by a user of a content access device than a second content of the set of content based on monitored behavior of the user, store the first content in a first storage device of a tiered group of storage devices, and store the second content in a second storage device of the tiered group of storage devices wherein the content access device is located closer to the first storage device than the second storage device.

In various examples, the tiered group of storage devices includes the content access device. In some examples, the processing unit moves a portion of an instance of the stored content once accessed.

In numerous examples, the processing unit determines there is an issue with an instance of the stored content and corrects the issue during storage. In various cases of such an example, the issue is that the instance of the stored content is incomplete or corrupt. In some cases of such an example, the issue is that at least a portion of the instance of the stored content has a resolution to be changed.

In various implementations, a method of digital content recording network interaction includes monitoring content access behavior of a user of a content access device, selecting a set of content to store in a tiered group of storage devices, ranking the set of content based on the monitored content access behavior of the user and managing storage of the set of content in the tiered group of storage devices such that higher ranked content of the set of content is stored on storage devices of the tiered group of storage devices with higher bandwidth connections to the content access device than storage devices of the tiered group of storage devices storing lower ranked content of the set of content.

In some examples, the method further includes determining to reorder at least a portion of storage of the set of content. In various cases of such examples, the method further includes reordering the portion of storage of the set of content if a priority of the reordering exceeds a network load for the reordering. In numerous cases of such examples, the method further includes reordering the portion of storage of the set of content if sufficient network bandwidth is available for the reordering.

In various examples, selecting the set of content includes automatically selecting the set of content for the user. In some examples, selecting the set of content includes selecting the set of content in response to user input. In numerous examples, ranking the set of content includes ranking the set of content based on the monitored content access behavior and a user ranking specification.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
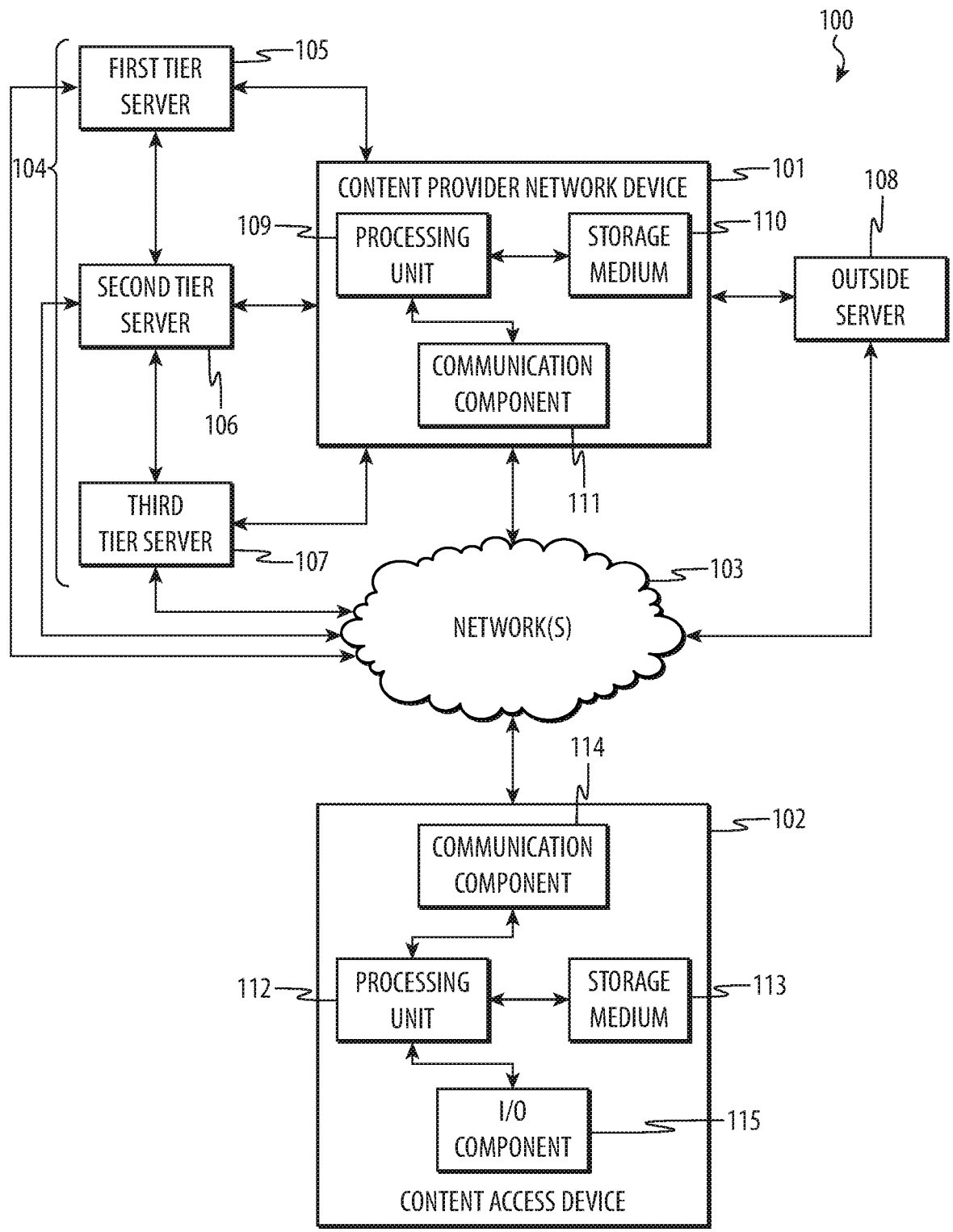
FIG. 1 depicts an example of a digital content recording network system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to tiered digital content recording. Digital content is recorded for a user of a content access device in a tiered group of storage devices. The storage is managed based on monitored behavior of the user so that recordings more likely to be accessed are more quickly accessible whereas recordings less likely to be accessed are less quickly accessible. This balances storage load with accessibility, resulting in a faster responding system that does not require as much storage.

The monitored behavior may track and/or correlate any kind of user behavior with respect to content access, characteristics of the content accessed, aspects of the situation in which the user accesses, and so on. This may include the content that is accessed, the user who accesses the content, an access time, an access location, a device used to access, a type of the content accessed, a category of the content accessed, a series to which the content belongs, an event associated with a time period of the access, social media activity of the user, social media activity of the user's contacts, and/or any other aspect of the user, the content, and/or the situation in which the access occurs.

The storage may be managed by moving (or reordering) one or more recordings after initial storage. This may be performed periodically, upon expiration of various intervals, upon the occurrence of various events, in response to changing conditions or storage availability, and/or various other conditions or events. For example, movement may be performed if the capacity of a storage device is determined to be filling up, such as where a free space warning threshold is reached. Movement may be all or part of a recording. In some cases, movement may only be performed if a priority of the move exceeds a network load for the move, if network traffic is below a threshold, and/or if a network connection otherwise allows for the movement.

Storage or movement of a recording may not be possible when attempted due to various issues. These may include device availability, storage capacity, network connection disruption, and/or various other conditions that may prevent storage or movement. In some implementations, a determination may be made that an issue prevents a determined storage or movement of content and the storage or movement may thus be delayed until the issue is resolved. In some cases of such implementations, the issue may be monitored continuously, periodically, or at various intervals or times to determine when the issue is resolved. In various cases of such implementations, various actions may be taken to resolve the issue, such as rerouting network connections, freeing up storage space, and so on.

Recordings may be analyzed after storage and may be determined to be corrupt, incomplete, and/or to otherwise have an issue of some kind. For example, content may be determined to be missing one or more portions, include a mixture of different resolutions that may not be rendered optimally when presented, utilize too much storage space, include one or more portions that are not presentable, and so on. In various implementations, an attempt may be made to fix stored content determined to have an issue. Missing portions may be replaced, non-uniform content (such as content including a mix of different resolutions) may be made more uniform, various actions may be performed to change storage space used (such as by changing the resolution of one or more portions, deleting portions, and so on), and/or various other actions may be performed to correct detected issues. In some cases, various portions of stored content may be replaced with versions of the stored content located elsewhere in a content provider network, on content access devices of other users, and so on.

In some implementations, partial content may be stored rather than the entirety, or part of the entirety of stored content may later be moved or deleted. For example, the first five minutes of a video may be recorded rather than the entirety of the video. This may use less storage space than the entire video. Should the user access the video, the recording of the first five minutes may provide sufficient time to obtain the rest of the video without the user noticing. This may balance accessibility with storage requirements.

In various cases, "partial" may include low resolution versions, such as where the first three minutes of a video are stored at full quality and the next ten are stored at a lower quality but are replaced while the first three minutes are presented. Should replacement not be possible in time, the lower quality version may still be presented. This further balances accessibility, storage requirements, and content quality.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 depicts an example of a digital content recording network system 100. The digital content recording network system 100 includes one or more content provider network devices 101 connected to tiered storage 104 and one or more content access devices 102 via one or more networks 103. The content provider network device 101 and/or another controller may be operable to store content for a user of the content access device 102 in the tiered storage 104 based on monitored behavior of the user of the content access device 102. This may balance storage load with accessibility, resulting in a faster responding system that does not require as much storage.

The tiered storage 104 may include various storage devices that are more quickly accessible to the content access device 102 than other storage devices. For example, a first level of the tiered storage 104 may be located closer to the content access device 102 than a second level (such as examples where a first level is located in the same city as the content access device 102, a second level is located in the same state as the content access device 102, and a third level is located at a remote central data facility in the same country as the content access device 102), resulting in content stored by the first level being more quickly accessible than that stored by the second level. By way of another example, a first level may be connected to the content access device by a faster and/or higher bandwidth network connection than a second level. The tiered storage 104 is illustrated in FIG. 1 as including three main levels, one or more first tier servers 105, one or more second tier servers 106, and/or one or more third tier servers 107. The first tier server 105, second tier server 106, and third tier server 107 may all be connected to the content provider network device 101 and/or the content access device 102 via the network(s) 103. Content stored by the first tier server 105 may be accessed quickest of the three by the content access device 102, followed by the second tier server 106 and then the third tier server 107. The tiered storage 104 may also include storage of the content provider network device 101 (which may be less quickly accessed than the first tier server 105, the second tier server 106, and the third tier server 107), storage of the content access device 102 (which may be more quickly accessed than the first tier server 105, the second tier server 106, and the third tier server 107), one or more outside servers 108 that provide storage outside of the content provider network, and so on. Regardless of the structure of the tiered storage 104, the content provider network device 101 and/or another controller may use the tiered storage 104 based on monitored behavior of the user of the content access device 102 to store content in a manner that balances storage load with accessibility.

The content provider network device 101 may include one or more processing units 109 (or processors), one or more non-transitory storage media 110 (which may take the form of, but is not limited to, a magnetic storage medium; optical storage medium; magneto-optical storage medium; read only memory; random access memory; erasable programmable memory; flash memory; and so on), one or more communication components 111, and/or other components. The processing unit 109 may execute one or more sets of instructions stored in the non-transitory storage medium 110 to perform one or more content provider network device functions, such as providing linear or non-linear content to the content access device 102, managing storage of content in the tiered storage 104, monitoring behavior of one or more users of the content access device(s) 102, communicating with the tiered storage 104 and/or the content access device 102 via the communication component 111, and so on.

Similarly, the content access device 102 may include one or more processing units 112 (or processors), one or more non-transitory storage media 113, one or more communication components 114, one or more user interface components 115 (such as one or more displays, speakers, printers, microphones, keyboards, touch screens, remote control devices, and so on), and/or other components. The processing unit 112 may execute one or more sets of instructions stored in the non-transitory storage medium 113 to perform one or more content access device functions, such as requesting or otherwise accessing content, presenting received content, and so on.

The tiered storage 104 and/or the interaction between the tiered storage 104 and the content provider network device 101 and/or the content access device 102 may allow the digital content recording network system 100 to perform a variety of different functions that a content storage system (such as a DVR that stores all recorded content locally) cannot perform, or cannot perform as efficiently. As discussed above, this may allow the digital content recording network system 100 to store content in a manner that balances storage load with accessibility. It may also enable monitoring of user behavior and taking of such user behavior into account for content storage decisions. Further, it may enable network problems to be responded to that could otherwise prevent storage. Additionally, correction of issues with stored content may be possible. Various features and improvements may be made possible.

Figure 2:
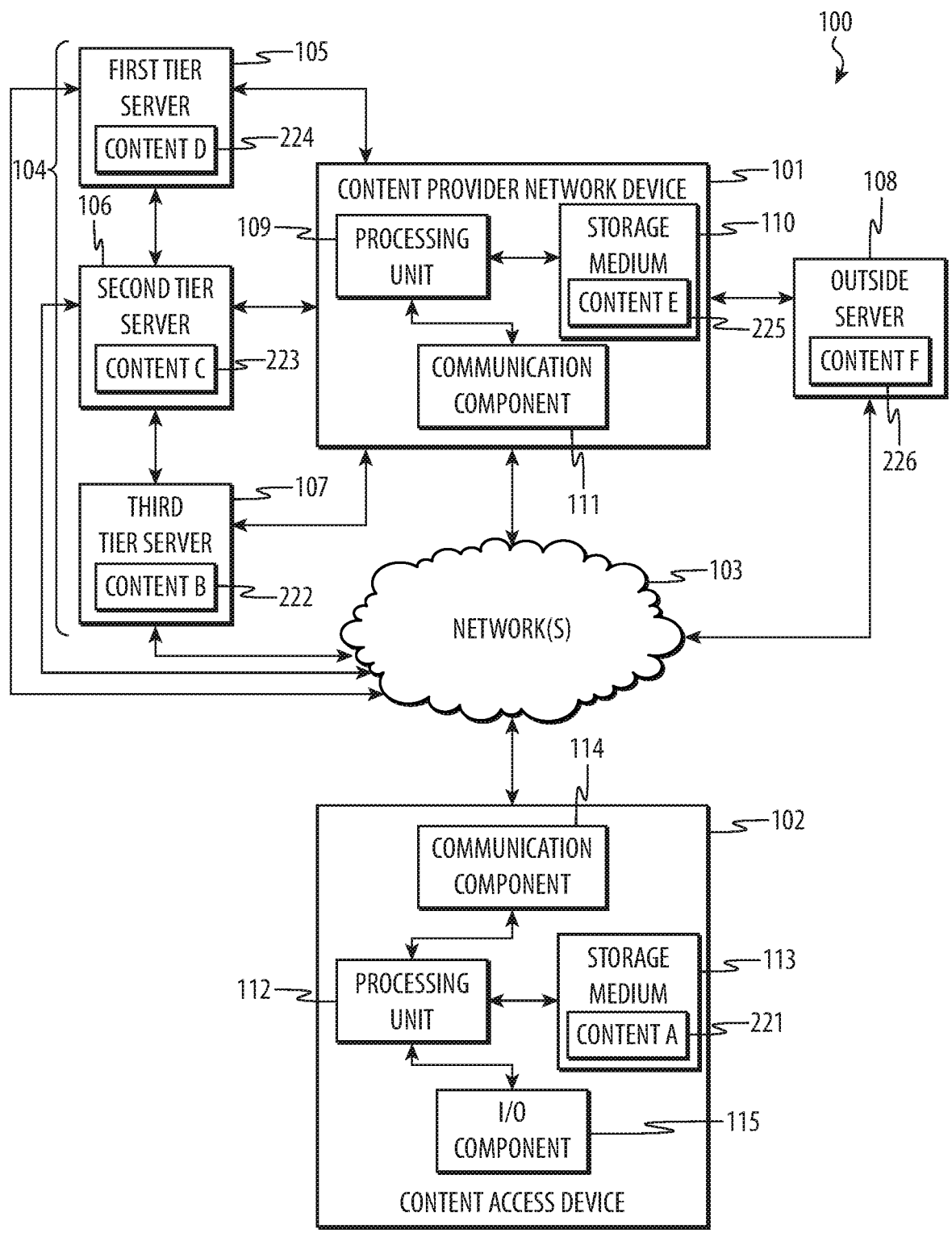
FIG. 2 depicts the example digital content recording network system of FIG. 1 after storing content.

FIG. 2 depicts the example digital content recording network system 100 of FIG. 1 after storing content. A Content A 221 may be stored in the non-transitory storage medium 113 of the content access device 102, a Content B 222 may be stored in the third tier server 107, a Content C 223 may be stored in the second tier server 106, a Content D 224 may be stored in the first tier server 105, a Content E 225 may be stored in the non-transitory storage medium 110 of the content provider network device 101, and a Content F 226 may be stored in the outside server 108.

The content provider network device 101 and/or another controller may have selected the Content A 221, Content B 222, Content C 223, Content D 224, Content E 225, and Content F 226 based on monitored user behavior, user requests to record content, and so on. The content provider network device 101 and/or another controller may also have selected the respective locations to record/store such content based on monitored user behavior, user requests to record content, available storage space, and so on.

For example, Content A 221 may have been specifically requested for recordation by the user. As Content A 221 was specifically requested, Content A 221 may be stored in the non-transitory storage medium 113 of the content access device 102 where it is most quickly accessible to the content access device 102.

By way of another example, Content D 224 may be a football game, Content C 223 may be a movie, and Content B 222 may be an episode of a police drama television show. Monitored user behavior may indicate that the user is likely to access all three, but that it is fall and the user watches more football than anything else in the fall. As such, Content D 224 may be stored in the first tier server 105 where it is more quickly accessible than Content B 222 and Content C 223. The monitored user behavior may indicate that the user is next likely to access Content C 223 followed by Content B 222. As such, Content C 223 may be stored in the second tier server 106 where it is next most quickly accessible, followed by Content B 222 stored in the third tier server 107.

Content B 222, Content C 223, and Content D 224 may not have been specifically requested by the user. Instead, the content provider network device 101 and/or another controller may have decided based on the monitored user behavior that the user was likely to request them, and thus to store them.

By way of still another example, the content provider network device 101 and/or another controller may determine that Content E 225 is a popularly requested game show by many users even if the monitored behavior information does not indicate a high likelihood that the user will request it. As such, Content E 225 may be stored in the non-transitory storage medium 110 of the content provider network device 101 where it is still reasonably accessible to the content access device 102 but does not consume available storage of storage devices that can provide content more quickly to the content access device 102.

In yet another example, the content provider network device 101 and/or another controller may make a variety of movies available that the monitored behavior information does not indicate the user will likely request, but still may. Thus, such movies, which may include Content F 226, may be stored on one or more outside servers 108 that provide a large amount of available storage space but may not respond to requests as quickly as other storage devices in the tiered storage 104. Various configurations are possible and contemplated.

In various implementations, the content that is stored and/or the locations of stored content may be changed. This may be changes based on changed in circumstances, changes in the monitored user behavior, changes in available storage, changes in available content, and/or any other factor that may affect how and/or what is stored.

Figure 3:
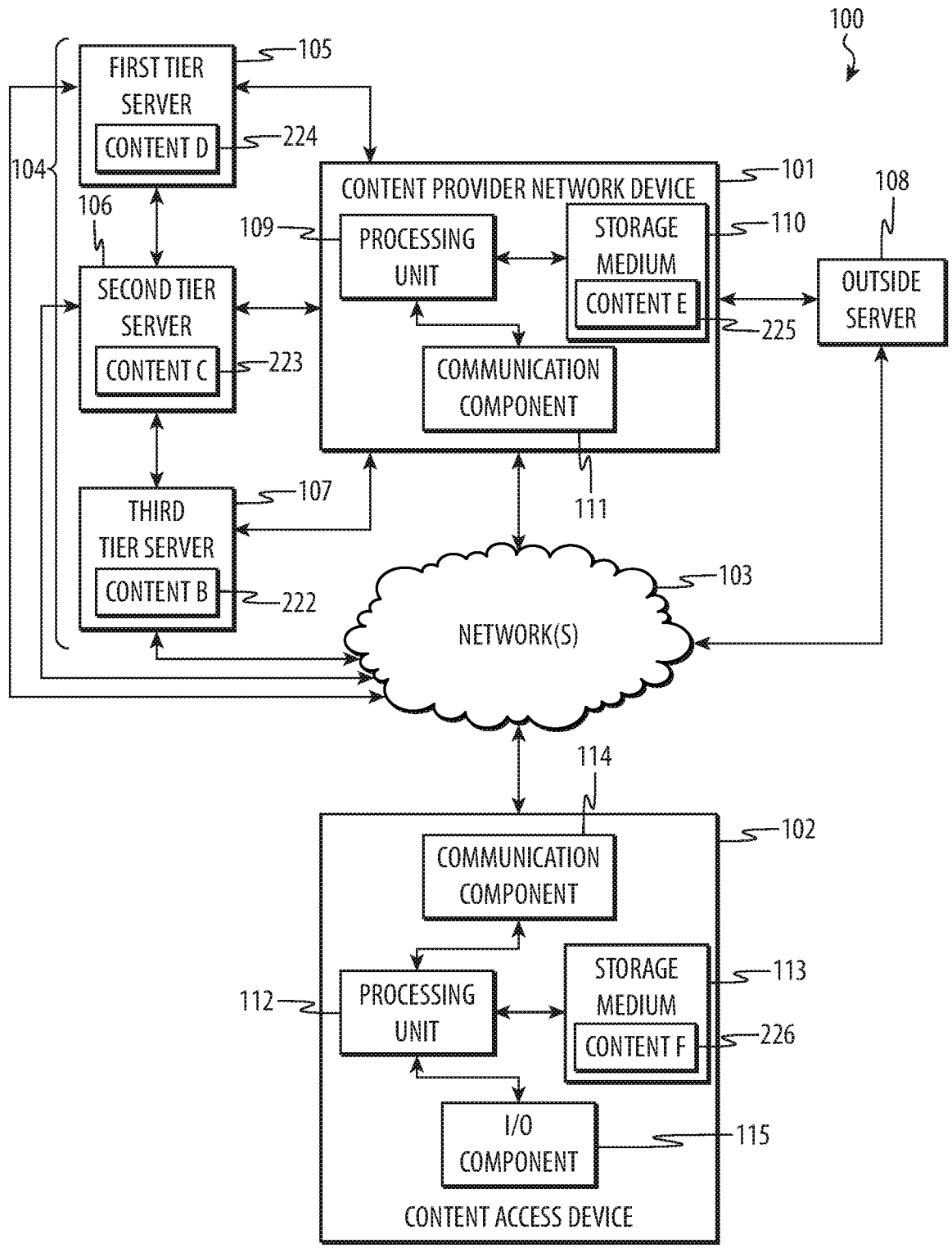
FIG. 3 depicts the example digital content recording network system of FIG. 2 after an example change to the stored content.

For example, FIG. 3 depicts the example digital content recording network system 100 of FIG. 2 after an example change to the stored content. In this example, the user may have accessed Content A 221, which may therefore have been removed from the non-transitory storage medium 113. The access of Content A 221 may also have altered the monitored user behavior such that it is determined that it is much more likely that the user will request Content F 226. As such, Content F 226 may have been moved into the space in the non-transitory storage medium 113 made available by deleting Content A 221.

Figure 4A:
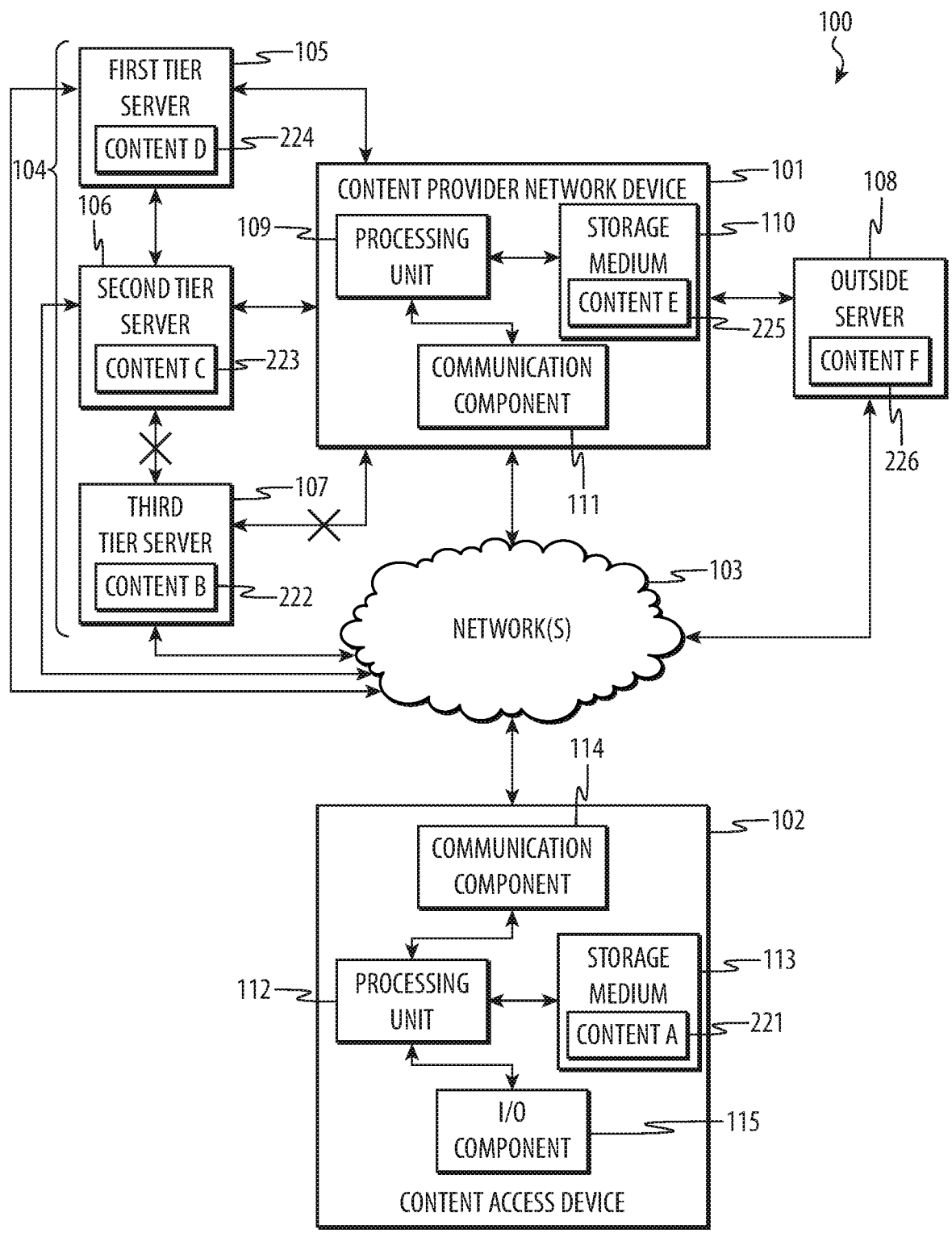
FIG. 4A depicts the example digital content recording network system of FIG. 2 after determining to make an example change to the stored content that is prevented by an issue.

In some implementations, the content provider network device 101 or other controller may determine to move or reorder content and determine that there is an issue preventing such a move. For example, FIG. 4A depicts the example digital content recording network system 100 of FIG. 2 after determining to make an example change to the stored content that is prevented by an issue. The user may have watched a different episode of the same police drama television show corresponding to Content B 222. This may indicate that the user is more likely to request Content B 222 than Content C 223 and their storage locations should be switched. However, network links to the third tier server 107 may be down. This may prevent moving of Content B 222 from the third tier server 107 and moving of Content C 223 to the third tier server 107.

Figure 4B:
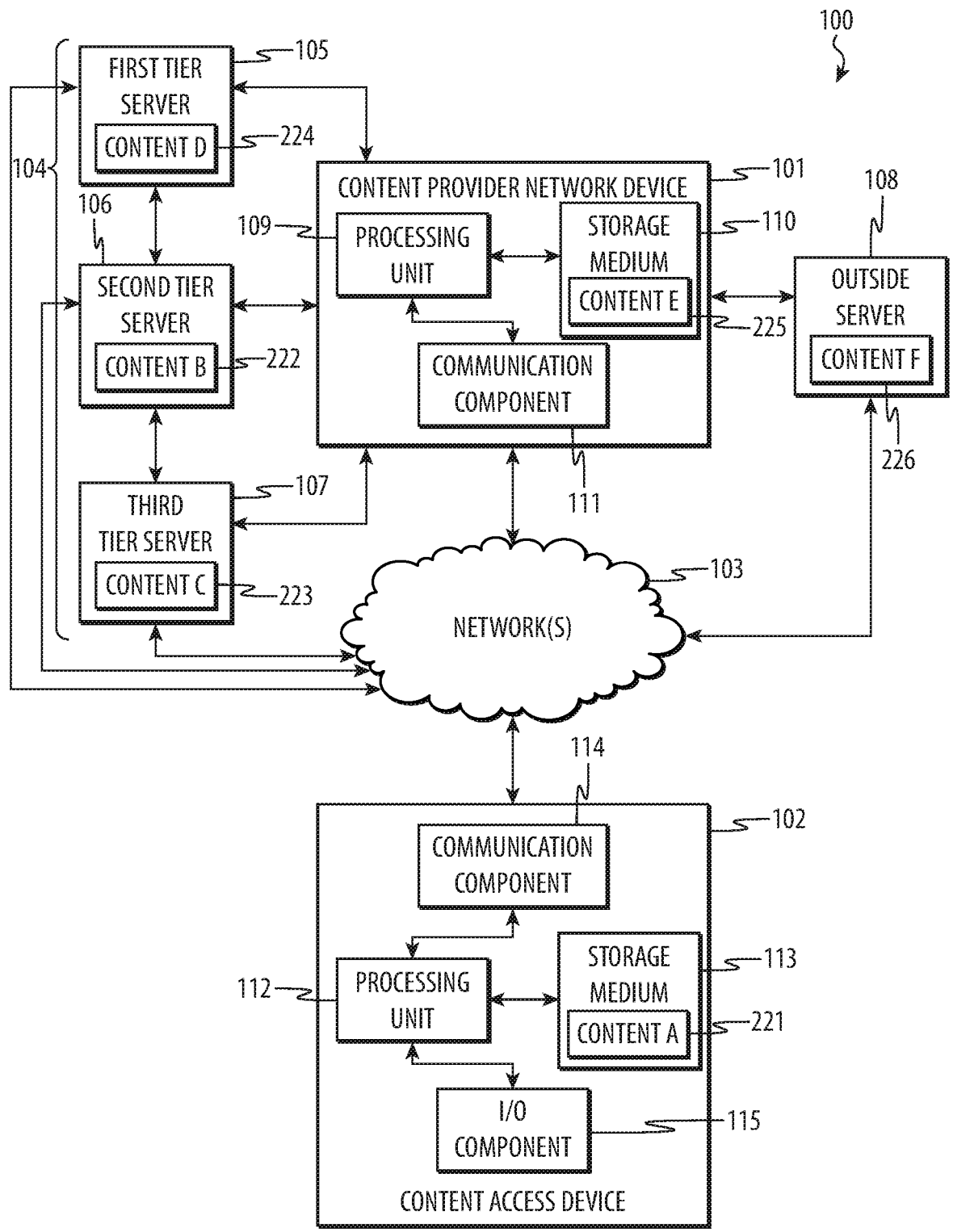
FIG. 4B depicts the example digital content recording network system of FIG. 4A after the issue is resolved.

In response, the content provider network device 101 or other controller may monitor the network links to the third tier server 107 until the movements can be performed. FIG. 4B depicts the example digital content recording network system 100 of FIG. 4A after the issue is resolved. Now that the network links are again available, Content B 222 has been moved from the third tier server 107 to the second tier server 106. Similarly, Content C 223 has been moved from the second tier server 106 to the third tier server 107.

The above illustrates and describes selecting and/or storing content based on the monitored user behavior of a user of the content access device 102. However, in various examples, the storage outside of the content access device 102 may be for one or more users of one or more content access devices 102. In such a case, the storage may be based on monitored user behavior of the multiple users that balances availability with available storage for multiple users and content access devices 102 as opposed to only one. Various configurations are possible and contemplated.

And, though such an implementation may not optimize storage for a particular content access device 102, content stored by other content access devices 102 may be available to the content access device 102. This may be more quickly accessed than other storage devices in the tiered storage 104 and may make some content available (such as to replace content that has become corrupt, failed to record, and so on) that would otherwise be unavailable for access.

Additionally, although the above illustrates and describes different levels of the tiered storage 104 as different storage devices, it is understood that this is an example. In various implementations, different levels of storage could be included in a single storage device. For example, a storage device may include a faster drive and a slower drive. Higher priority content may be stored on the faster drive whereas the slower drive may be used to store lower priority content. Various configurations are possible and contemplated.

The above discussed content may be various different kinds of content in various implementations. Content may include video content, audio content, image content, data content, and/or any other kind of content.

The content access device 102 may be any kind of electronic device operable to access content. This may include laptop computing devices, desktop computing devices, mobile computing devices, tablet computing devices, wearable devices, smart phones, digital media players, set top boxes, cellular telephones, and so on. Similarly, the content provider network device 101 and/or the first tier server 105, the second tier server 106, and/or the third tier server 107 may be implemented as any kind of suitable electronic device.

It is understood that the above are for the purposes of example. In various implementations, one or more of the above techniques may be utilized in a variety of different systems and devices in a variety of different combinations. Numerous combinations are possible and contemplated.

For example, in some embodiments, a digital content recording network (such as the example digital content recording network system 100 of FIG. 1) may include a tiered group of storage devices and a controller, communicably coupled to the tiered group of storage devices, that manages storage of a set of content in the tiered group of storage devices based on monitored behavior of a user of a content access device. The controller may determine a first content of the set to be a higher priority for the user than a second content of the set of content based on the monitored behavior and direct storage of the first content in a first storage device of the tiered group of storage devices and the second content in a second storage device of the tiered group of storage devices that is less quickly accessible to the content access device than the first storage device.

In various implementations, the controller may determine to move at least some of the stored content within the tiered group of storage devices based at least on the monitored behavior. In some examples, the controller may move the determined content. In numerous examples, the controller may move a first portion of an instance of the stored content without moving a second portion. In various examples, the controller may determine a connection issue prevents movement of the determined content, wait until the connection issue is resolved, and move the determined content. In some examples, the controller may determine to move at least some of the stored content based on a change in the monitored behavior of the user or a change in circumstances. In numerous examples, the controller may determine to move at least some of the stored content based on a change in storage capacity.

In various embodiments, a digital content recording network controller device may be operable to determine a first content of a set of content to be more likely to be requested by a user of a content access device than a second content of the set of content based on monitored behavior of the user, store the first content in a first storage device of a tiered group of storage devices, and store the second content in a second storage device of the tiered group of storage devices wherein the content access device is located closer to the first storage device than the second storage device. In some examples, the digital content recording network controller device may be one or more devices of the example digital content recording network system 100 of FIG. 1.

In some implementations, the tiered group of storage devices may include the content access device. In numerous implementations, the digital content recording network controller device may move a portion of an instance of the stored content once accessed.

In various implementations, the digital content recording network controller device may determine there is an issue with an instance of the stored content and correct the issue during storage. In some examples, the issue may be that the instance of the stored content is incomplete or corrupt. In various examples, the issue may be that at least a portion of the instance of the stored content has a resolution to be changed.

In numerous embodiments, a method of digital content recording network interaction may be provided. In some implementations, the method may be performed by one or more devices of the example digital content recording network system 100 of FIG. 1. The method may include monitoring content access behavior of a user of a content access device, selecting a set of content to store in a tiered group of storage devices, ranking the set of content based on the monitored content access behavior of the user, and managing storage of the set of content in the tiered group of storage devices such that higher ranked content of the set of content is stored on storage devices of the tiered group of storage devices with higher bandwidth connections to the content access device than storage devices of the tiered group of storage devices storing lower ranked content of the set of content.

In various implementations, the method may further include determining to reorder at least a portion of storage of the set of content. In numerous examples of such implementations, the method may further include reordering the portion of storage of the set of content if a priority of the reordering exceeds a network load for the reordering. In some examples of such implementations, the method may further include reordering the portion of storage of the set of content if sufficient network bandwidth is available for the reordering.

In numerous implementations, the operation of selecting the set of content may include automatically selecting the set of content for the user. In various implementations, the operation of selecting the set of content may include selecting the set of content in response to user input. In some implementations, the operation of ranking the set of content includes ranking the set of content based on the monitored content access behavior and a user ranking specification.

Figure 5:
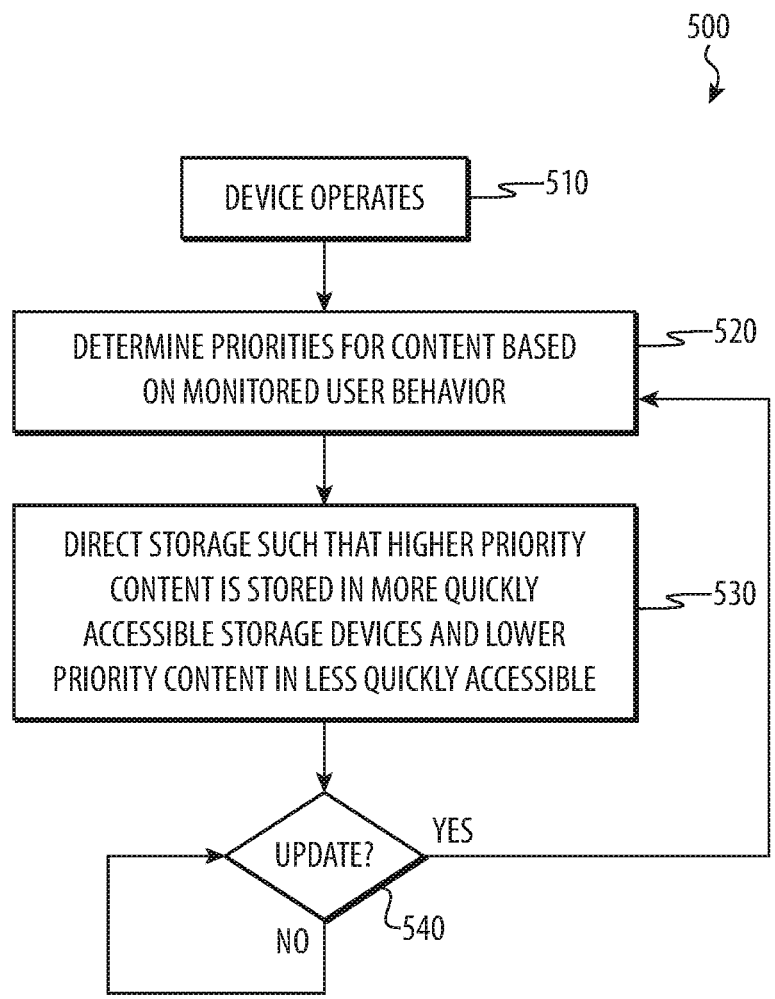
FIG. 5 depicts a flow chart illustrating a first example method of digital content recording network interaction. This first example method may be performed by one or more devices of the example digital content recording network system of FIG. 1.

FIG. 5 depicts a flow chart illustrating a first example method 500 of digital content recording network interaction. This first example method 500 may be performed by one or more devices of the example digital content recording network system 100 of FIG. 1.

The flow begins at 510 where a device operates. The device may be a computing device operable to manage storage of content for the user of a content access device in a content provider network. The flow then proceeds to 520 where the device determines priorities for content based on monitored user behavior. Next, the flow proceeds to 530 where the device directs storage of the content in a tiered storage system. The device directs storage such that higher priority content is stored in storage devices that are more quickly accessible to the content access device. Similarly, the device directs storage such that lower priority content is stored in storage devices that are less quickly accessible to the content access device.

However, content priorities determined based on monitored user behavior may change. Determined content priorities may change because the user is monitored performing different behavior than when previously observed. Determined content priorities may also change based on changes in current circumstances (such as where the user is more likely to access football content during the fall and the seasons have changed from summer to fall). Determined content priorities may also change based on other factors, such as the availability of new content, changes in storage capacities of storage devices, receipt of user requests to store and/or how to store content, and/or any other factors that impact optimal ways to balance user desired content availability, hardware and software resources, access speed, and so on.

As such, the flow proceeds to 540 where the device determines whether or not to update the determined content priorities. If so, the flow returns to 520 where the device re-determines the priorities before the flow returns to 530 and the device reorders storage. Otherwise, the flow returns to 540 where the device again determines whether or not to update the determined content priorities.

Although the first example method 500 is illustrated and described as including particular operations performed in a particular order, it is understood that this is an example. In various implementations, various orders of the same, similar, and/or different operations may be performed without departing from the scope of the present disclosure.

For example, the first example method 500 is illustrated and described as prioritizing and storing an entire group of content at a time. However, this is for the purposes of simplicity and clarity. In various implementations, any set or subset of content, including a single instance of content, may be prioritized, reprioritized, stored, moved, and so on without departing from the scope of the present disclosure.

Figure 6:
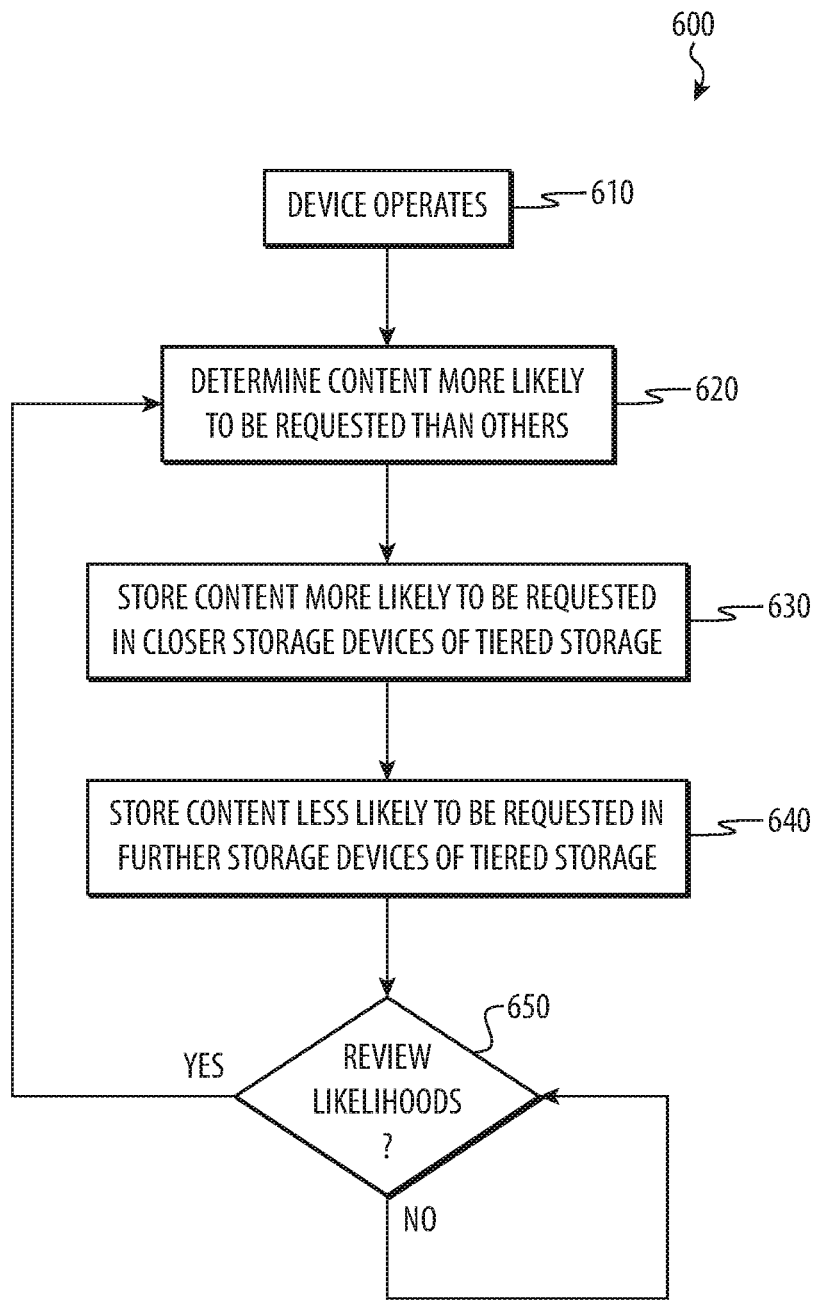
FIG. 6 depicts a flow chart illustrating a second example method of digital content recording network interaction. This second example method may be performed by one or more devices of the example digital content recording network system of FIG. 1.

FIG. 6 depicts a flow chart illustrating a second example method 600 of digital content recording network interaction. This second example method 600 may be performed by one or more devices of the example digital content recording network system 100 of FIG. 1.

The flow begins at 610 where a device operates. The device may be a computing device operable to manage storage of content for the user of a content access device in a content provider network. The flow then proceeds to 620 where the device determines content more likely to be requested and/or otherwise accessed by the user of a content access device than other content. Next, the flow proceeds to 630 where the device stores content more likely to be requested in storage devices of tiered storage that are closer to the content access device. The flow then proceeds to 640 where the device stores content less likely to be requested in storage devices of the tiered storage that are further away the content access device.

Next, the flow proceeds to 650 where the device determines whether or not to review the determined likelihoods for request or other access of any of the content. If so, the flow returns to 620 where the device revisits the likelihood and/or modifies any storage locations accordingly. Otherwise, the flow returns to 650 where the device again determines whether or not to review the determined likelihoods for request or other access of any of the content.

Although the second example method 600 is illustrated and described as including particular operations performed in a particular order, it is understood that this is an example. In various implementations, various orders of the same, similar, and/or different operations may be performed without departing from the scope of the present disclosure.

For example, the second example method 600 is illustrated and described as storing content more likely and less likely to be requested. However, it is understood that this is for the purposes of clarity and simplicity. In various implementations, any number of different levels of likelihood (and/or storage locations) may be analyzed according to any number of different procedures or evaluation metrics without departing from the scope of the present disclosure.

Further, the second example method 600 is illustrated and described as the device storing the content. However, in various implementations, the device may be a controller operable to direct storage of the content in one or more other devices communicably connected to the controller. Various system configurations are possible and contemplated.

Figure 7:
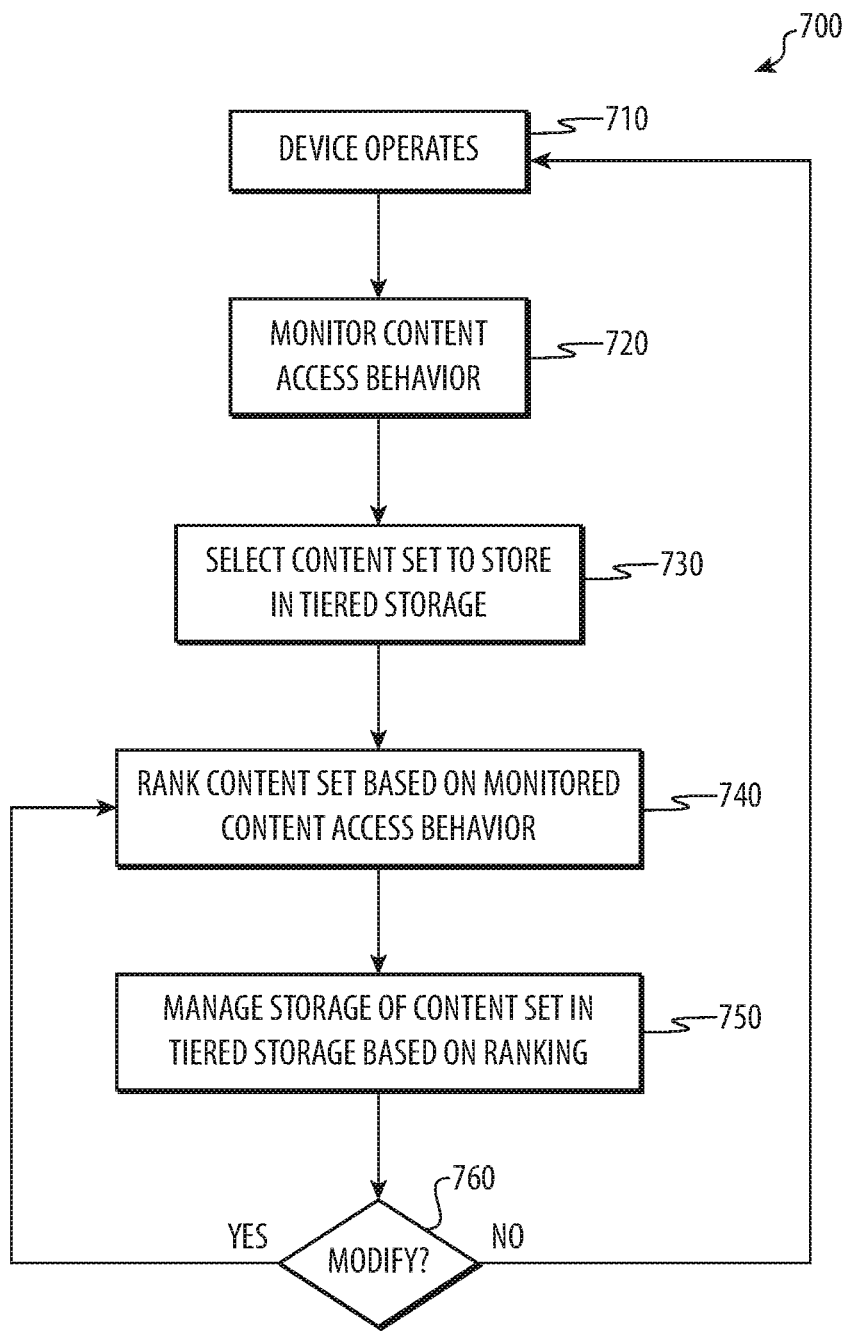
FIG. 7 depicts a flow chart illustrating a third example method of digital content recording network interaction. This third example method may be performed by one or more devices of the example digital content recording network system of FIG. 1.

FIG. 7 depicts a flow chart illustrating a third example method 700 of digital content recording network interaction. This third example method 700 may be performed by one or more devices of the example digital content recording network system 100 of FIG. 1.

The flow begins at 710 where a device operates. The device may be a computing device operable to manage storage of content for the user of a content access device in a content provider network. The flow then proceeds to 720 where the device monitors content access behavior performed by the user of a content access device. Monitoring content access behavior may include monitoring any aspect of the user's behavior and/or the situation in which the behavior occurs. For example, the monitoring may include observing and recording information regarding accessed content, interfaces encountered, content offered that was not accessed, content accessed rather than other content offered, interaction with content during presentation (such as stopping, starting, pausing, fast forwarding, rewinding, switching to other content, recording, and so on), recording instructions, access times, access locations, devices used to access, user identifiers, social media activity related to the access, events occurring at the time of access (such as sporting tournaments, weather conditions, emergencies, breaking news, and so on), and/or any other aspect of content access behavior and/or the context in which such behavior occurs. The flow may then proceed to 730.

At 730, the device selects a content set to store in tiered storage. The content set may be selected based on user recording instructions, content determined to be recorded based on the monitored content access behavior, a mixture thereof, and/or any other factors relating to content set selection. The flow then proceeds to 740 where the device ranks the content set based on the monitored content access behavior.

Next, the flow proceeds to 750 where the device manages storage of the content set in tiered storage based on the ranking. The flow then proceeds to 760 where the device determines whether or not to modify the rankings (and/or the content set, the storage of the content set, and so on). If so, the flow returns to 740 where the device modifies accordingly. Otherwise, the flow returns to 710 where the device continues to operate.

Although the third example method 700 is illustrated and described as including particular operations performed in a particular order, it is understood that this is an example. In various implementations, various orders of the same, similar, and/or different operations may be performed without departing from the scope of the present disclosure.

For example, the third example method 700 is illustrated and described as returning to 740 after determining to modify. However, if the device determines at 760 to modify the content set, the flow may instead return to 730 where the device modifies the content set.

Further, the third example method 700 is illustrated and described as monitoring the content access behavior at 720 before selecting content to include in a content set. However, it is understood that this is for the purposes of simplicity and clarity. In various implementations, the content access behavior may be monitored continuously, periodically, and/or on various other kinds of schedules. Numerous configurations are possible and contemplated.

Figure 8:
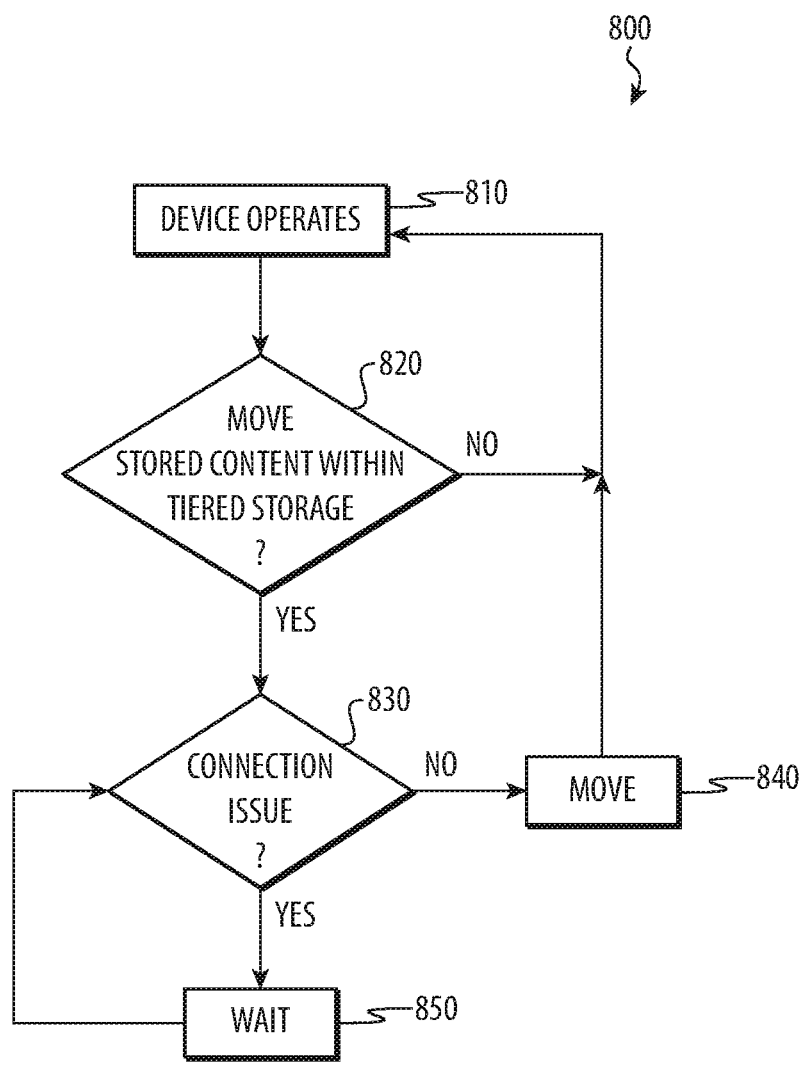
FIG. 8 depicts a flow chart illustrating a fourth example method of digital content recording network interaction. This fourth example method may be performed by one or more devices of the example digital content recording network system of FIG. 1.

FIG. 8 depicts a flow chart illustrating a fourth example method 800 of digital content recording network interaction. This fourth example method 800 may be performed by one or more devices of the example digital content recording network system 100 of FIG. 1.

The flow begins at 810 where a device operates. The device may be a computing device operable to manage storage of content in tiered storage for the user of a content access device in a content provider network.

The flow proceeds to 820 where the device determines whether or not to move content around within the tiered storage. This may include copying or moving content to a higher level in the tiered storage, copying or moving content to a lower level in the tiered storage, copying or moving content to the device, copying or moving content to the content access device, deleting stored content, deleting or moving part of stored content, replacing stored all or part of stored content with another version (such as with a higher or lower resolution version), and so on. If so, the flow proceeds to 830. Otherwise, the flow returns to 810 where the device continues to operate.

At 830, the device determines whether or not there is a connection issue that prevents the determined move of the content within the tiered storage. Such connection issues may include network connection links that are down or otherwise unusable (such as overburdened), devices that are unable to respond (such as devices that are down or overburdened), and/or any other conditions that prevent the determined move of the content within the tiered storage. If not, the flow proceeds to 840 where the device performs the move before the flow returns to 810 and the device continues to operate. Otherwise, the flow proceeds to 850.

At 850, after the device determines there is a connection issue that prevents the determined move of the content within the tiered storage, the device waits for the issue to resolve. The flow may then return to 830 where the device determines whether or not the issue remains.

Although the fourth example method 800 is illustrated and described as including particular operations performed in a particular order, it is understood that this is an example. In various implementations, various orders of the same, similar, and/or different operations may be performed without departing from the scope of the present disclosure.

For example, the fourth example method 800 is illustrated and described as waiting for the issue to be resolved. However, in various implementations, the device may attempt to fix or correct the issue, wait only until the expiration of a timeout until determining the move cannot be made, attempt to perform an alternate move (such as moving to a higher or lower tier of the tiered storage when the selected one is unavailable), and/or may respond to the issue in various other ways.

Figure 9:
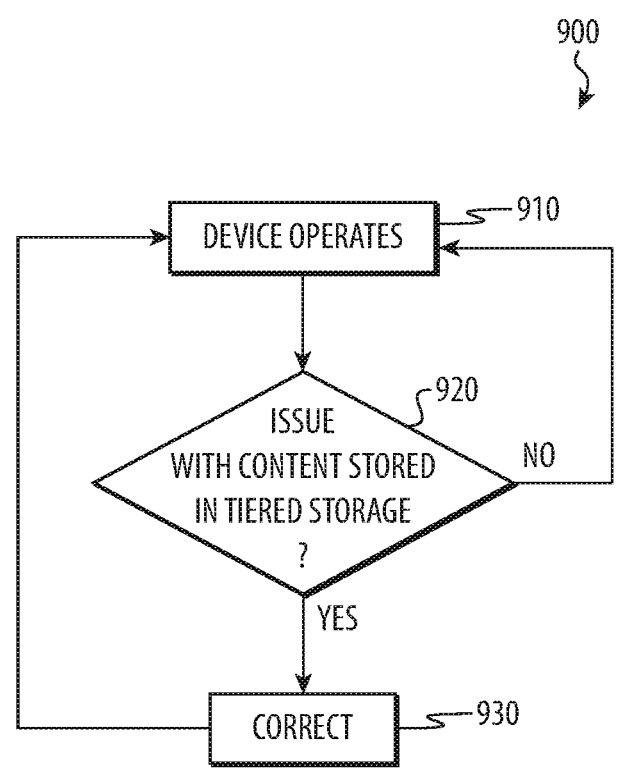
FIG. 9 depicts a flow chart illustrating a fifth example method of digital content recording network interaction. This fifth example method may be performed by one or more devices of the example digital content recording network system of FIG. 1.

FIG. 9 depicts a flow chart illustrating a fifth example method 900 of digital content recording network interaction. This fifth example method 900 may be performed by one or more devices of the example digital content recording network system 100 of FIG. 1.

The flow begins at 910 where a device operates. The device may be a computing device operable to manage storage of content for the user of a content access device in a content provider network. The flow then proceeds to 920 where the device determines whether or not there is an issue with content stored in tiered storage. If so, the flow proceeds to 930 where the device corrects the issue with the content before the flow proceeds to 910 and the device continues to operate. Otherwise, the flow directly returns to 910.

The issue with the stored content may be any variety of issues. For example, the issue may be that the stored content is incomplete and correcting the issue may include obtaining and storing portions of the content to add in one or more incomplete portions. By way of another example, the issue may be that the stored content or a portion thereof is corrupt and/or otherwise non-presentable (such as requiring a different renderer than is available to a content access device) and correcting the issue may include replacing the stored content or the portion thereof with a version that is not corrupt. By way of still another example, the issue may be related to resolution of the content (such as where the content has a lower than desired resolution, a higher than desired resolution, a mixed resolution where a uniform resolution is desired, a uniform resolution where a mixed resolution is desired) and correcting the issue may involve replacing one or more portions of the content with a version that does not suffer from the issue. In yet another example, the issue may be that the content is occupying too much of limited available storage and correcting may include deleting all or a portion of the content and/or replacing all or a portion of the content with a version that occupies less storage space. Various situations are possible and contemplated.

Although the fifth example method 900 is illustrated and described as including particular operations performed in a particular order, it is understood that this is an example. In various implementations, various orders of the same, similar, and/or different operations may be performed without departing from the scope of the present disclosure.

For example, the fifth example method 900 is illustrated and described as determining there is an issue and correcting the issue. However, in various examples, the device itself may not be able to correct the issue. Instead, the device may act by requesting another device to correct the issue, notifying a user or other entity, and so on.

Figure 10:
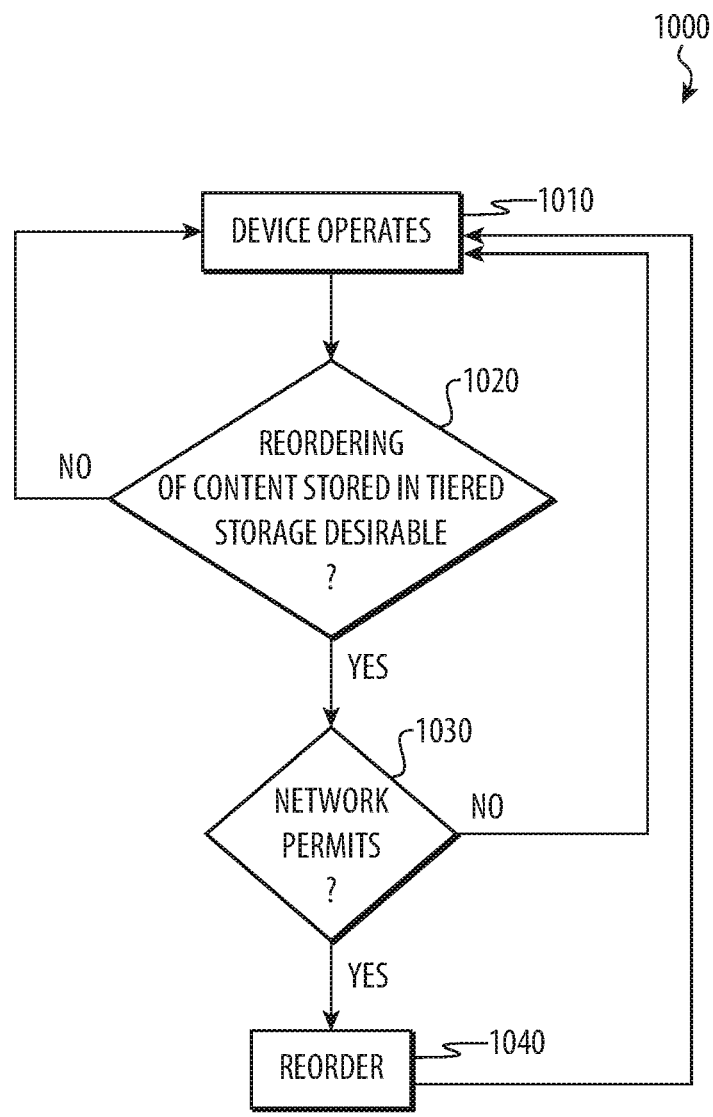
FIG. 10 depicts a flow chart illustrating a sixth example method of digital content recording network interaction. This sixth example method may be performed by one or more devices of the example digital content recording network system of FIG. 1.

FIG. 10 depicts a flow chart illustrating a sixth example method 1000 of digital content recording network interaction. This sixth example method 1000 may be performed by one or more devices of the example digital content recording network system 100 of FIG. 1.

The flow begins at 1010 where a device operates. The device may be a computing device operable to manage storage of content for the user of a content access device in a content provider network. The flow then proceeds to 1020 where the device determines whether or not reordering of content stored in tiered storage is desirable. If so, the flow proceeds to 1030. Otherwise, the flow returns to 1010 where the device continues to operate.

The device may determine that reordering of content stored in tiered storage is desirable based on any number of different conditions. Such conditions may include changes in monitored user behavior that affect whether or not content is stored and/or where in the tiered storage the content is stored, changes in a current situation related to monitored user behavior, the availability of new content, changes in storage capacity, the addition of new storage devices, the removal and/or non-availability of storage devices, and/or any other conditions that may relate to what content is stored where in the tiered storage.

At 1030, after the device determines that reordering of content stored in the tiered storage is desirable, the device determines whether or not one or more networks connected to the device and/or the tiered storage permits the reordering. If so, at 1040 the device reorders. Otherwise, the flow returns to 1010 and the device continues to operate.

The device may determine that the network permits the reordering based on a variety of different conditions. For example, the device may determine whether or not sufficient network bandwidth is currently available, whether the current available network bandwidth would not cause the reordering to adversely impact user content access, and so on. In such an example, the device may only perform the reordering if sufficient network bandwidth is available for the reordering such that the reordering would not adversely impact user content access.

In other examples, the device may weigh network bandwidth against a priority or ranking of the reordering. For example, the device may perform high priority reordering when less network bandwidth is available but may wait until more network bandwidth is available to perform lower priority reordering.

In still other examples, the reordering may be performed across leased network connections. In such cases, the priority of reordering may be weighed against the cost of using the leased network connection. The reordering may be performed only if the priority justifies the expense.

Although the sixth example method 1000 is illustrated and described as including particular operations performed in a particular order, it is understood that this is an example. In various implementations, various orders of the same, similar, and/or different operations may be performed without departing from the scope of the present disclosure.

For example, the sixth example method 1000 is illustrated and described as only reordering if the network permits. However, in various implementations, such a determination may be omitted. Instead, the device may perform reordering whenever determining that reordering is desirable.

As described above and illustrated in the accompanying figures, the present disclosure relates to tiered digital content recording. Digital content is recorded for a user of a content access device in a tiered group of storage devices. The storage is managed based on monitored behavior of the user so that recordings more likely to be accessed are more quickly accessible whereas recordings less likely to be accessed are less quickly accessible. This balances storage load with accessibility, resulting in a faster responding system that does not require as much storage.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A digital content recording network, comprising:
    a group of tiered storage devices; and
    at least one controller, communicably coupled to the group of tiered storage devices, that:
        manages storage of a set of content in the group of tiered storage devices;
        determines at least some of the set of content within the group of tiered storage devices is to be moved;
        when a priority assigned to moving the at least some of the set of content exceeds a network load to which the moving will subject a network, moves the at least some of the set of content; and
        when the priority assigned to moving the at least some of the set of content does not exceed the network load, omits moving the at least some of the set of content.

2. The digital content recording network of claim 1, wherein the at least one controller determines to move the at least some of the set of content within the group of tiered storage devices based at least on monitored behavior of a user of a content access device.

3. The digital content recording network of claim 2, wherein the at least one controller moves the at least some of the set of content within the group of tiered storage devices.

4. The digital content recording network of claim 2, wherein the at least one controller moves a first portion of a single item of content of the at least some of the set of content without moving a second portion of the single item of content of the at least some of the set of content.

5. The digital content recording network of claim 2, wherein the at least one controller determines to move the at least some of the set of content based on a change in the monitored behavior of the user.

6. The digital content recording network of claim 2, wherein the at least one controller determines to move the at least some of the set of content based on a change in circumstances.

7. The digital content recording network of claim 2, wherein the at least one controller determines to move the at least some of the set of content based on a change in storage capacity.

8. A digital content recording network controller device, comprising:
    a non-transitory storage medium that stores instructions; and
    a processor that executes the instructions stored in the non-transitory storage medium to:
    manage storage of a set of content in a group of tiered storage devices;
    determine to reorder at least some of the set of content within the group of tiered storage devices;
    when a priority assigned to reordering the at least some of the set of content exceeds a network load to which the reordering will subject a network, move the at least some of the set of content; and
    when the priority assigned to reordering the at least some of the set of content does not exceed the network load, omit moving the at least some of the set of content.

9. The digital content recording network controller device of claim 8, wherein the group of tiered storage devices includes a content access device.

10. The digital content recording network controller device of claim 8, wherein the processor moves only a portion of a single item of content of the set of content once accessed.

11. The digital content recording network controller device of claim 8, wherein the processor:
 makes a determination that a first content of the set of content is more likely to be requested by a user of a content access device than a second content of the set of content;
 controls storage of the first content in a first storage device of the group of tiered storage devices; and
 controls storage of the second content in a second storage device of the group of tiered storage devices.

12. The digital content recording network controller device of claim 11, wherein the content access device can access the first storage device faster than the second storage device.

13. The digital content recording network controller device of claim 8, wherein the processor manages the storage of the set of content in the group of tiered storage devices based on monitored behavior of a user of a content access device.

14. A method of digital content recording network interaction, comprising:
 selecting a set of content to store in a group of tiered storage devices;
 using a controller to control storage of the set of content in the group of tiered storage devices;
 when a priority assigned to reordering at least a portion of the storage of the set of content exceeds a network load to which the reordering will subject a network, reordering the at least the portion of the storage of the set of content; and
 when the priority assigned to reordering the at least the portion of the storage of the set of content does not exceed the network load, omit reordering the at least the portion of the storage of the set of content.

15. The method of claim 14, wherein determining to reorder the at least the portion of the storage of the set of content comprises determining to reorder the at least the portion of the storage of the set of content based at least on content access behavior of a user.

16. The method of claim 15, further comprising reordering the at least the portion of the storage of the set of content if network bandwidth is available for the reordering.

17. The method of claim 14, wherein a first storage device of the group of tiered storage devices has a different access time than a second storage device of the group of tiered storage devices.

18. The method of claim 14, wherein the selecting the set of content comprises selecting the storage of the set of content based on content access behavior of a user.

19. The method of claim 14, wherein the using the controller to control the storage of the set of content in the group of tiered storage devices comprises using the controller to control the storage of the set of content in the group of tiered storage devices based on content access behavior of a user.

* * * * *